WALTER WURST
INVENTOR

Patented Mar. 6, 1928.

1,661,744

UNITED STATES PATENT OFFICE.

WALTER WURST, OF BERLIN, GERMANY, ASSIGNOR TO GESELLSCHAFT FÜR DRAHT-LOSE TELEGRAPHIE M. B. H., OF BERLIN, GERMANY, A CORPORATION OF GERMANY.

METHOD AND ARRANGEMENT FOR TRANSFERRING SIGNALS BETWEEN MOVING VEHICLES AND ROADBEDS.

Application filed August 9, 1924, Serial No. 731,036, and in Germany September 8, 1923.

My invention relates to a method and arrangement for signaling between moving vehicles, such as railroad trains, and a stationary location along the road bed, as, for instance, a location on the track.

It has for its object to provide such a method and arrangement whereby a positive and certain signal is obtained when the vehicle passes the said location.

Other objects will be apparent from the following description and claims when considered with the accompanying drawing, in which:

According to the present invention a tube transmitter with inductive grid coupling is employed and this grid coupling is so loosely chosen that no oscillations normally are generated. Only when the grid coil and the plate coil are nearing a receiving circuit tuned to the frequency of the oscillatory circuit, do oscillations set in. The alterations of current produced by the starting of the oscillations affect a signaling relay.

Figure 1:
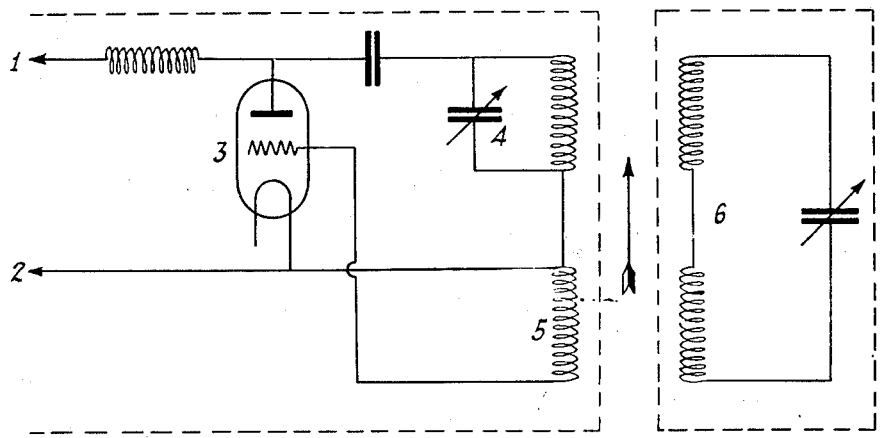
Fig. 1 is an arrangement embodying one form of my invention.

Fig. 1 shows an example of the schematic connection of the present invention. 1 is the anode current conductor and 2 the filament current conductor, 3 the cathode tube generator, 4 the oscillatory circuit, 5 the inductive grid coupling coil. 6 is an oscillatory circuit tuned to the frequency of the transmitter and arranged on the railway line. According to the main application and to Fig. 1 of the present application, the oscillatory circuit arranged on the railway line is a closed circuit.

Figure 2:
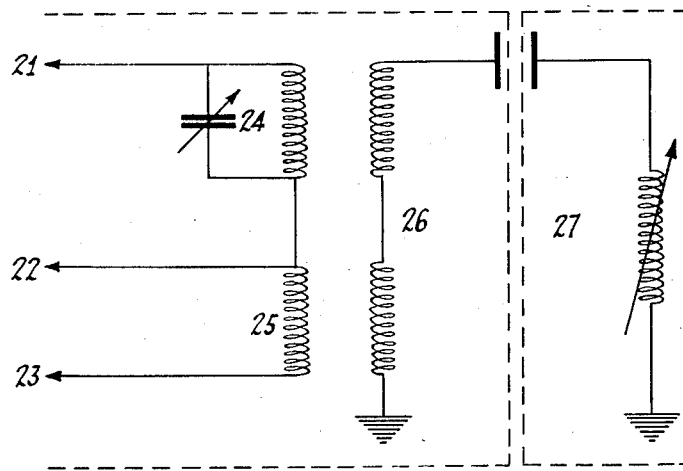
Fig. 2 is a modification.

In order to attain an increased insurance against an undesired release of the signaling relay, the oscillatory circuit arranged on the railway line can also be so divided that one part of such an oscillatory circuit is arranged on the locomotive itself and the other part on the railway line, that is, the oscillatory circuit on the line may be an open circuit. Fig. 2 shows this embodiment of the present invention. 21 is the anode conductor, 22 the wire connecting the cathode to the anode circuit and grid circuit of the vacuum tube, 23 the grid connection, 24 the oscillatory circuit, 25 the inductive grid coupling coil as explained in connection with Fig. 1. 26 is that part of the receiving circuit tuned to the frequency of the oscillator on the locomotive, and 27 is the other part of this receiving circuit. Fig. 2 shows that the open circuit 27 arranged on the line is combined with the part arranged on the locomotive into a closed oscillatory circuit only when the locomotive approaches this location on the line.

It can thus be seen that regenerative oscillation will occur only when locomotive is in the particular location of the tuned circuit. When this occurs the change of current in the plate circuit or otherwise will actuate a relay coil (not shown) or other equivalent device to show the desired signal.

Having described my invention, I claim:

1. In combination, a regenerative vacuum tube circuit having a loose coupling between input and output circuits, and means for closely coupling said circuits when brought into effective relationship thereto, whereby oscillations are developed and the stability of the circuit is modified.

2. In combination, a regenerative vacuum tube circuit having a loose coupling between input and output circuits mounted on a movable body, and means for closely coupling said circuits mounted on a stationary body whereby oscillations are developed in the tube circuit when the coupling means are brought into effective relationship with the tube circuit.

3. In combination, a three electrode oscillator having anode and grid coils spaced apart from each other and mounted on a movable body, and stationary coils for coupling to the movable coils having tuning means attached thereto, whereby the movable coils may be inductively coupled to produce oscillations in the oscillator.

4. In combination, a normally non-oscillating oscillation generating device mounted on a movable body, means for causing oscillations therein mounted on a stationary body within range of the route taken by the movable body and means for relatively adjusting the frequency at which oscillations will be produced mounted on said stationary body.

5. In combination, a normally non-oscillating oscillation generating device mounted on a movable body, means for causing oscillations therein mounted on a stationary body and means for relatively adjusting the frequency at which oscillations will be produced mounted on said stationary body, and means for predetermining the frequency at which oscillations will occur mounted on the movable body.

WALTER WURST.